United States Patent
Gilbert et al.

(10) Patent No.: US 7,318,648 B2
(45) Date of Patent: Jan. 15, 2008

(54) AUTO DIMMING VEHICLE MIRROR

(75) Inventors: Robert William Gilbert, Willunga (AU); Kash A. Munir, Westbourne Park (AU)

(73) Assignee: Schefenacker Vision Systems Australia Pty Ltd. (AU)

( * ) Notice: Subject to any disclaimer, the term of this patent is extended or adjusted under 35 U.S.C. 154(b) by 55 days.

(21) Appl. No.: 10/482,007

(22) PCT Filed: Jul. 2, 2002

(86) PCT No.: PCT/AU02/00862

§ 371 (c)(1),
(2), (4) Date: Dec. 23, 2003

(87) PCT Pub. No.: WO03/004312

PCT Pub. Date: Jan. 16, 2003

(65) Prior Publication Data

US 2004/0169930 A1  Sep. 2, 2004

(30) Foreign Application Priority Data

Jul. 2, 2001 (AU) .................................... PR6021

(51) Int. Cl.
*G02B 17/00* (2006.01)
*G02B 5/08* (2006.01)
(52) U.S. Cl. .................. 359/608; 359/603; 359/604; 359/270
(58) Field of Classification Search ........ 359/601–615, 359/265–275, 838, 577–590
See application file for complete search history.

(56) References Cited

U.S. PATENT DOCUMENTS

| 4,603,946 | A | * | 8/1986 | Kato et al. ................... 349/195 |
| 4,690,508 | A |   | 9/1987 | Jacob .......................... 349/195 |
| 5,153,760 | A |   | 10/1992 | Ahmed ....................... 345/116 |
| 5,377,037 | A | * | 12/1994 | Branz et al. ................. 359/265 |
| 5,406,414 | A | * | 4/1995 | O'Farrell et al. ........... 359/604 |
| 5,434,407 | A | * | 7/1995 | Bauer et al. ........... 250/227.24 |
| 5,668,663 | A | * | 9/1997 | Varaprasad et al. ......... 359/608 |
| 5,805,330 | A | * | 9/1998 | Byker et al. ................ 359/265 |
| 6,014,247 | A |   | 1/2000 | Winter et al. ............... 359/296 |
| 6,055,089 | A | * | 4/2000 | Schulz et al. ............... 359/270 |
| 6,164,783 | A |   | 12/2000 | Peterson et al. ............ 359/603 |

FOREIGN PATENT DOCUMENTS

FR  2233828  6/1973
FR  2 513 198  3/1983

* cited by examiner

*Primary Examiner*—Thong Q Nguyen

(57) ABSTRACT

A vehicle mirror assembly comprising a reflective element for reflecting incident light, the reflective element having a viewable side, a dimming element for varying the intensity of light reflected from the viewable side, a photo-electric power cell for powering the dimming element for varying the intensity of reflected light and a controller for controlling the dimming element in response to ambient light conditions, wherein, in use, the intensity of the light reflected from the viewable side is reduced in low ambient light conditions. In other embodiments a power source is defined, for providing interment power to power the dimming element for varying the intensity of light reflected, the power being supplied by the photo-electric power cell.

15 Claims, 6 Drawing Sheets

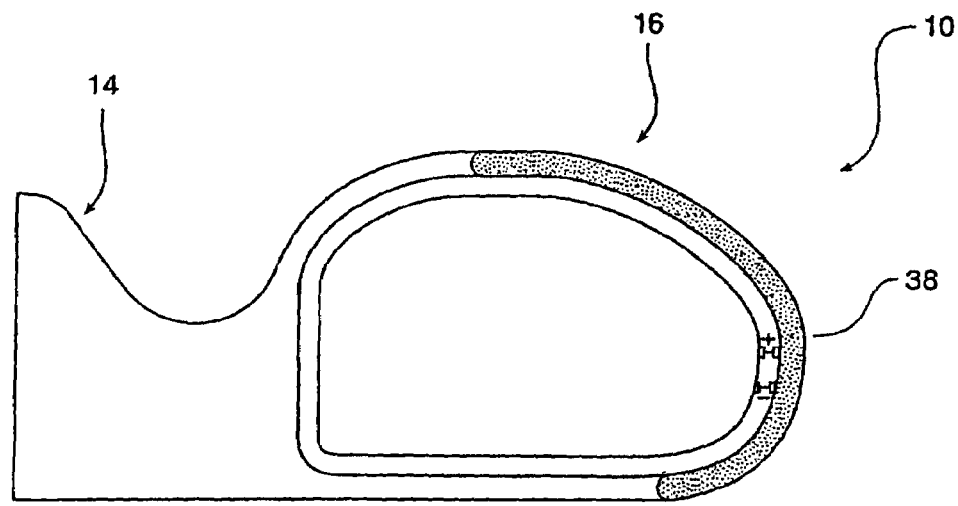
Fig 7
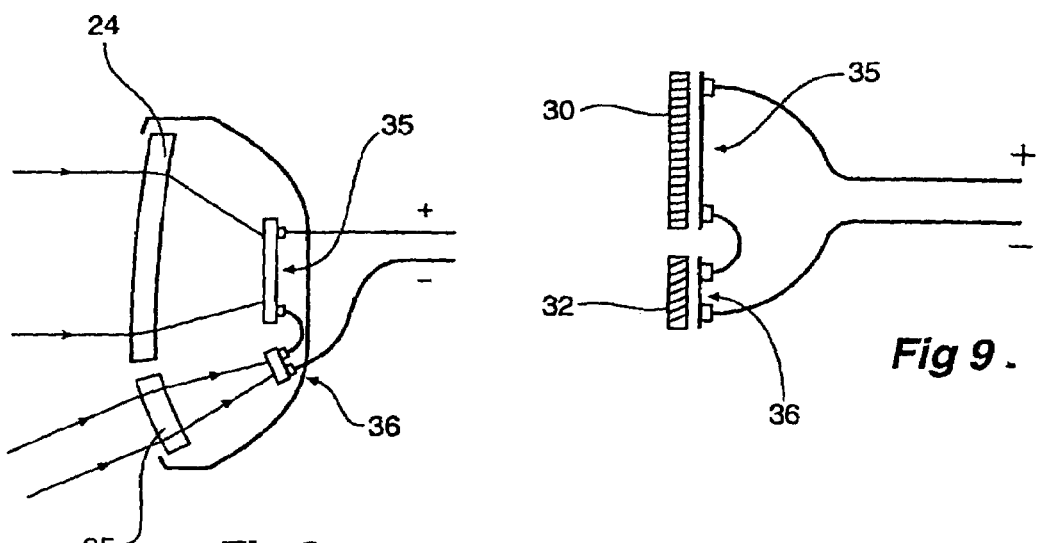
Fig 8
Fig 9
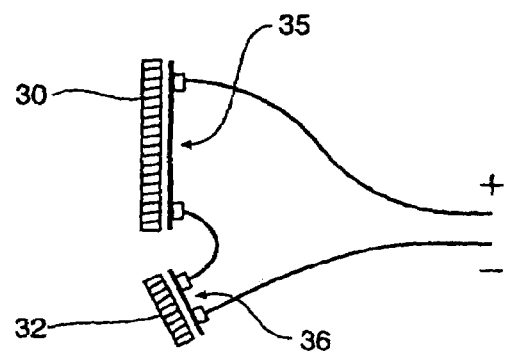
Fig 10

AUTO DIMMING VEHICLE MIRROR

FIELD OF THE INVENTION

The present invention relates to vehicle mirrors and in particular to vehicle mirrors that have the capacity to decrease the intensity or reflected light ("dim") during certain conditions.

BACKGROUND

Modern vehicles are equipped with a plurality (typically three) of rear view mirrors which, in use, are all positioned to allow the driver to view other vehicles behind his or her vehicle.

During night time driving conditions, glare caused by the reflection of the following vehicle head lights in these rear view mirrors presents a problem to the driver. There is a need to reduce this glare while allowing the driver to continue to see behind the vehicle.

Known solutions to night time head light glare have included interior rear view mirrors that are manually manipulable between a day time reflecting positions and a night time reflecting position. These mirrors use first and second surface reflections from prisms with a reflective coating on one surface. Also known are external vehicle mirrors (wing mirrors) that have dimmable mirrors controlled and powered from the vehicle.

A disadvantage with known electronic dimming methods has been cost and complexity and the need to integrate with vehicle systems or other mirrors for a dimming signal and for power supply. Therefore, it is desirable to develop an automatic dimming rear view mirror that detects light from predetermined angles as a dimming signal or power supply.

It is an object of the invention to provide improved automatic dimming for ear view mirrors.

SUMMARY OF THE INVENTION

According to the invention there is provided a vehicle mirror assembly comprising:

a reflective element for reflecting incident light, the reflective element having a viewable side of the reflective element;

a means for varying the intensity of light reflected from the viewable side, such as a dimming element;

a photo-electrical power cell for powering the means for varying the intensity of reflected light or a dimming element in response to ambient light conditions, wherein, in use, the intensity of the light reflected from the viewable side is reduced in low ambient light conditions.

The reflection of incident light from the headlights of following vehicles (glare light) at night is thereby reduced.

The means for varying the intensity of light reflected takes a number of forms. For instance it takes the form of a conventional reflective element (a glass or plastic sheet having a thin reflective layer bonded to one side) overlayed with a light transmitting sheet that is dimmable. Or if may take the form of a special reflective element the reflective properties of which are variable.

According to a first preferable form of the invention, the device for converting light into electrical power uses the incident light to produce sufficient real-time power to power the means for varying the intensity of light reflected without the need for a power storage means.

With this first preferable form of the invention, the source of power is glare light from following vehicles (for instance).

Preferably, the mirror assembly further comprises an incident light directional element arranged and constructed to exclude incident light from reaching the photo-electrical power cell where the angle of incidence of the incident light falls outside of preset angles.

According to a second preferable form of the invention, mirror assembly further comprises a power storage means wherein the source of power for the means for varying the intensity of light reflected is ambient light and the power storage means provides peak power to power the means for varying the intensity of light reflected.

Preferably, the control means or controller for controlling the means for varying the intensity of reflected light comprises an ambient light directional element and a photo-electrical switching device, the ambient light directional element arranged and constructed to pass the ambient light to the photo-electrical switching device only where the angle of incidence of the ambient light falls within a preset range.

In an alternate embodiment, a transparent photo-electrical power cell is used, the power cell overlaying the means for varying the intensity of light.

Specific embodiments of the invention will now be described in some further detail with reference to and as illustrated in the accompanying figures. These embodiments are illustrative, and are not meant to be restrictive of the scope of the invention.

BRIEF DESCRIPTION OF THE DRAWINGS

FIG. 7 is a front plan view of an alternate embodiment of the vehicle mirror assembly where the light receiving aperture or lens is not behind the reflective element;

FIG. 8 is a schematic view of an alternate embodiment of the light receiving components of the vehicle mirror assembly;

FIG. 9 is a schematic view of an alternate embodiment of the light receiving components of the vehicle mirror assembly; and FIG. 10 is a schematic view of an alternate embodiment of the light receiving components of the vehicle mirror assembly.

DETAILED DESCRIPTION OF THE PREFERRED EMBODIMENTS OF THE INVENTION

Figure 1:
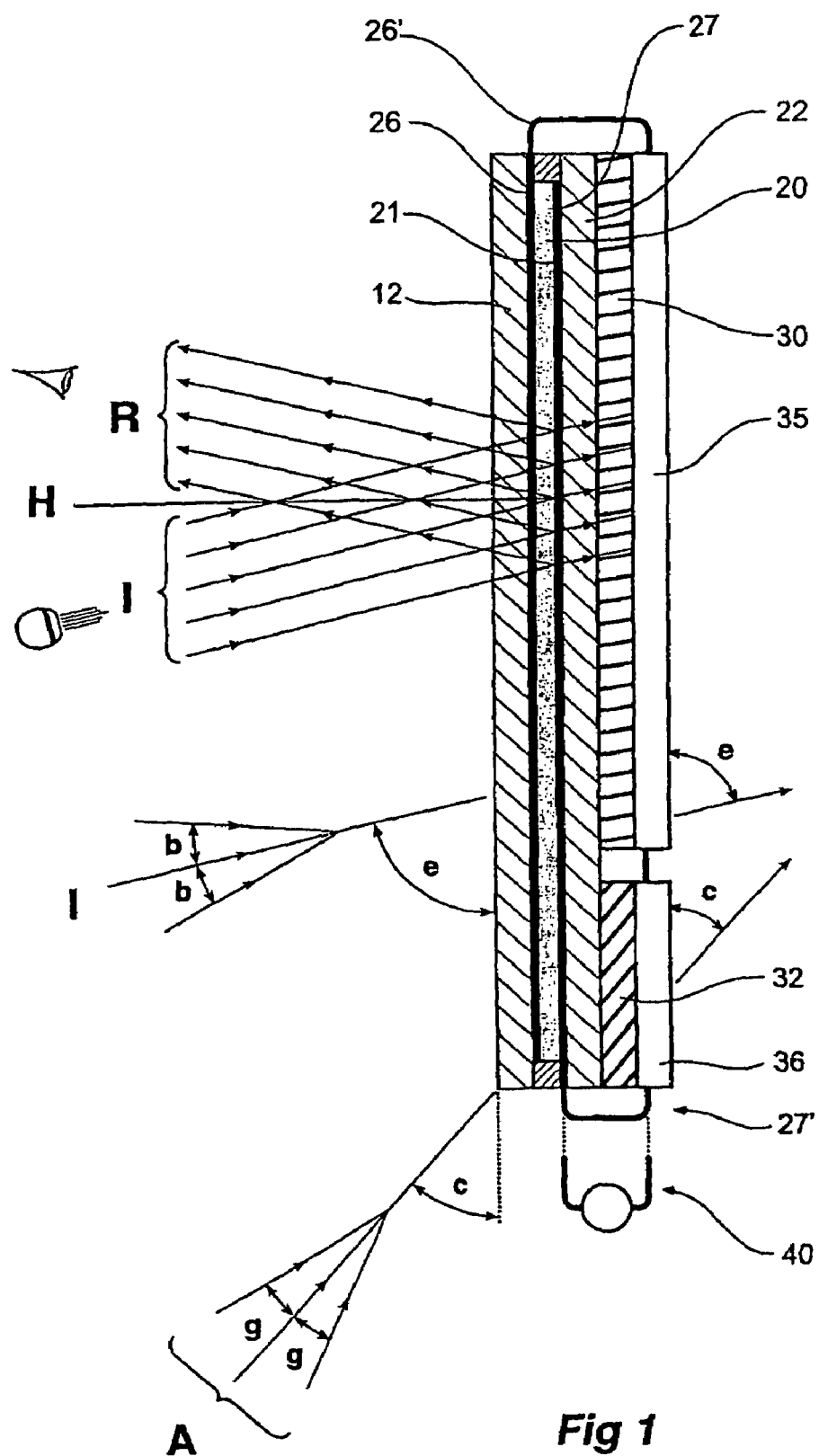
FIG. 1 is a schematic sectional view of a preferred embodiment of a vehicle mirror assembly in accordance with the present invention.

Referring to FIG. 1, a vehicle mirror assembly 10 comprises a reflective element 21 for reflecting incident light, a means for varying the intensity of light reflected from the reflective element in the form of an electro-optic dimming element 20 and an external glass pane 12. The dimming element 20 takes a number of forms. For instance the dimming element 200 is in the form of a gel or liquid containing crystals or other suspended particles (such as used in LCD displays or electro-chromic films). Any other suitable electro-optic device may be used.

The reflective element 21 is selected to reflect approximately 60% of incident light. A portion of the remaining 40% of the light passes through the reflective element 21 and through an internal glass pane 22 to a device for converting light into electrical power that is a photo-electrical power cell, in the form of a photo-voltaic cell 35. The photo-voltaic cell 35 is provided to power the dimming element 20. A photo-electrical switching device in the form of a photo switch 36 is connected to the photo-voltaic cell 35 and is connected to an electrode 27 through a conductor 27'. This electrode 27 is either a separate element or the reflective element functioning as an electrode. A second electrode 26, that is transparent, is connected to the photo-voltaic cell 35 by a conductor 26' as shown in FIG. 1.

The photo switch 36 (or alternatively another photo-electrical switching device such as a light sensitive resisting element) in combination with a directional filter 32 provides a means for controlling the dimming element 20 in response to the ambient light conditions.

With the embodiment shown in FIG. 1, the photo switch 36 is connected in series with the power source 35 and therefore is designed to switch off, or substantially off, when it receives strong ambient light, thereby ensuring that power from the power source 35 does not flow to the dimming element during day light hours (or other times of high ambient light).

In other embodiments, not shown, photo switches 35 that switch on when they receive light are employed in conjunction with an alternative appropriate circuit arrangement.

Directional filters 30 and 32 are provided between the internal glass pane 22 and the photo-voltaic element 35 and the photo switch 36 respectively to insure that only incident light from selected directions reach the photovoltaic element 35 and photo switch 36, respectively.

As shown in FIG. 1, the glare directional filter 30 is arranged to allow incident light "I" with incident angle e+/−b (measured with respect to the plane of the reflective element 21) to reach the photo-voltaic element 35. Light having an incident angle outside this range, is prevented from reaching the photo-voltaic element 35 by the directional filter 30. Because the photo-voltaic element 35 powers the dimming element 20, power is only available from light with an incident angle that will pass through the glare filter 30. In other words, the dimming element 20 only receives power from glare light and therefore only dims glare light. Depending on the application, the incident angle of glare light allowed through by the dimming element 20 may be varied.

For a driver's side mirror, directional filter 30 is orientated at about 76° (angle e shown in FIG. 1) to the plane of the reflective element 21. (For a passenger side mirror, directional filter 30 is orientated at about 60°). The directional filter 30 is constructed so as to allow light having an incident angle e=76° (60°)+ or −b=20° to allow for mirror angle adjustment for different drivers.

In high ambient light conditions, it is not necessary or desirable to have the dimming element 20 operational. An ambient light directional filter 32 is provided between the internal glass 20 and the photo switch 36 to ensure that ambient light "A" coming from directions outside of the glare directions reaches the photo switch 36. In this embodiment, the directional filter 32 allows light to pass through where that light has an incident angle of c+/−g (to the plane of the reflective element 21). With this arrangement, during periods of high ambient light (such as during daylight hours) light reaches the photo-switch 36 causing a reduction (or elimination) of signals to the dimming element 20. The reduced (or eliminated) signals result in little or no dimming of the dimming element 20. Thus in daylight conditions, the mirror functions like a conventional non-dimming mirror.

The angles shown in FIG. 1 and discussed above are all measured with a horizontal plane parallel to the ground. However, in an alternate embodiment, the ambient light directional filter 32 is orientated to discriminate against light from this plane, thereby, avoiding glare light interference. In another alternate embodiment, the ambient light directional filter 32 is crescent shaped and is positioned at any convenient location around the mirror.

Figure 2:
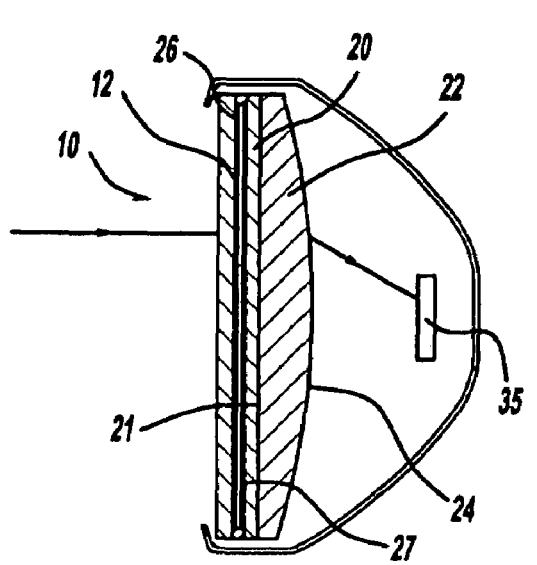
FIG. 2 is a schematic sectional view of an alternate embodiment of a vehicle mirror assembly in accordance with the present invention.

FIG. 2 shows an alternative embodiment of a first preferred form of the invention in which a vehicle mirror assembly 10 comprises a reflective element 21, a means for varying the intensity of light reflected from the reflective element in the form of an electro-optic dimming element 20 and an external glass pane 12. With this embodiment of the invention, a light concentrator in the form of a fresnel lens 24 is used in conjunction with a photo-voltaic cell 35. By using such a concentrator the intensity of the light falling on the photo-voltaic cell 35 is increased and the need for a directional filter, such as directional filter 30 shown in FIG. 1, is eliminated. (A fresnel lens is inherently directional).

Figure 3:
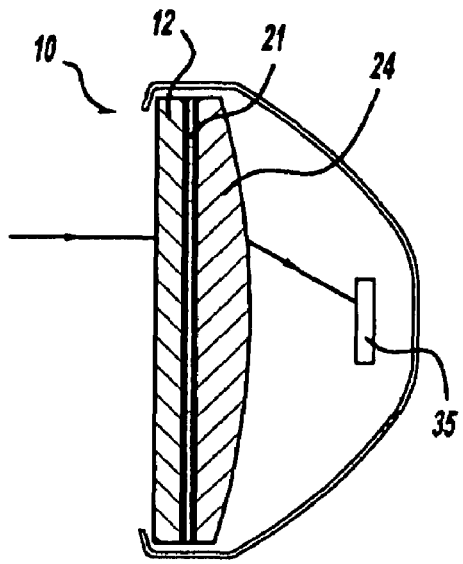
FIG. 3 is a schematic sectional view of an alternate embodiment of a vehicle mirror assembly in accordance with the present invention.

FIG. 3 shows a further alternative embodiment of a first preferred form on the invention. With this embodiment, the reflective element 21 and the dimming element 20 are one. The reflective element 21 is an electro-optic device capable of changing its level of reflectance in response to the application of a voltage. Various electro-optic devices are used to provide such a variable reflective element.

With both of the above two embodiments shown in FIGS. 2 and 3, the control means for controlling the level of reflectivity of the reflecting element 21 take a number of forms. For instance it takes the form of a combination of a directional filter and a photo switch, such as that used in the embodiment described and illustrated in FIG. 1, or it takes the form of a controller described below.

The photo-voltaic cell 35 is positioned behind the reflective element 21 in all the abovedescribed embodiments (shown in FIGS. 1, 2, and 3). In an alternate configuration, a transparent photoelectric power cell (a photo-voltaic cell or a solar cell) 35 is placed in front of (on the viewable side) of the reflective element 21.

Figure 1A:
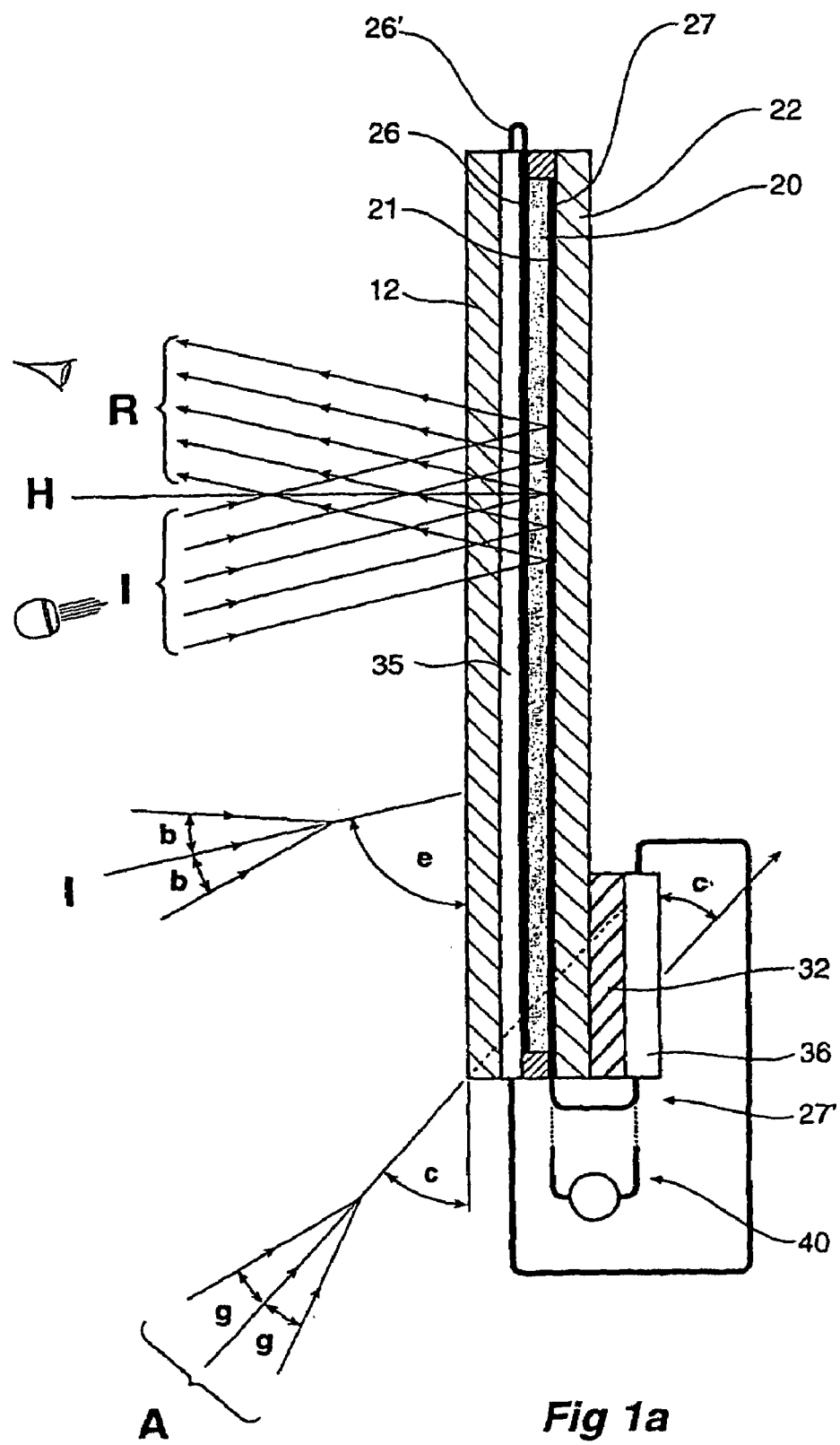
FIG. 1a is a schematic sectional view of an alternate embodiment of a vehicle mirror assembly in accordance with the present invention.

With the embodiment shown in FIG. 1a, the power to the dimming element 20 is reduced when incident light is non glare light since the projected area of the solar cell 35 is reduced where the angle of incidence of the light is high. In addition to this effect, a transparent solar cell 35 having directional properties is employed. In this way, the overall assembly will not dim the image reflected to the driver excessively when non glare light is incident on the mirror.

Figure 1B:
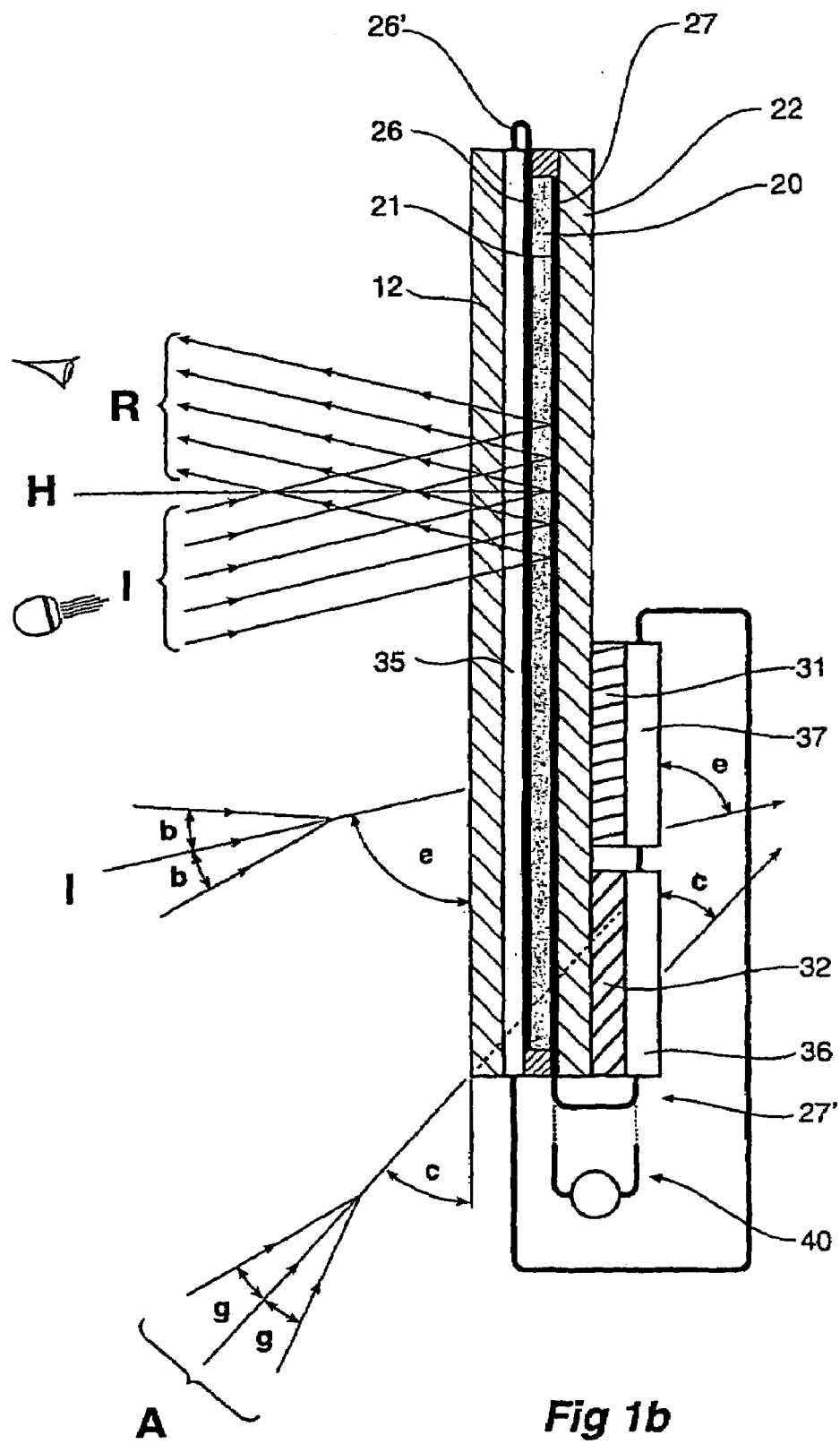
FIG. 1b is a schematic sectional view of an alternate embodiment of a vehicle mirror assembly in accordance with the present invention.

With the embodiment shown in FIG. 1b, a further photo switch 37 together with a directional filter 31 is employed. These additional elements are provided to ensure that only glare light activates the dimming element 20. With this arrangement, a solar cell 35 with no inherent directional properties or poor inherent directional properties is employed.

Figure 4:
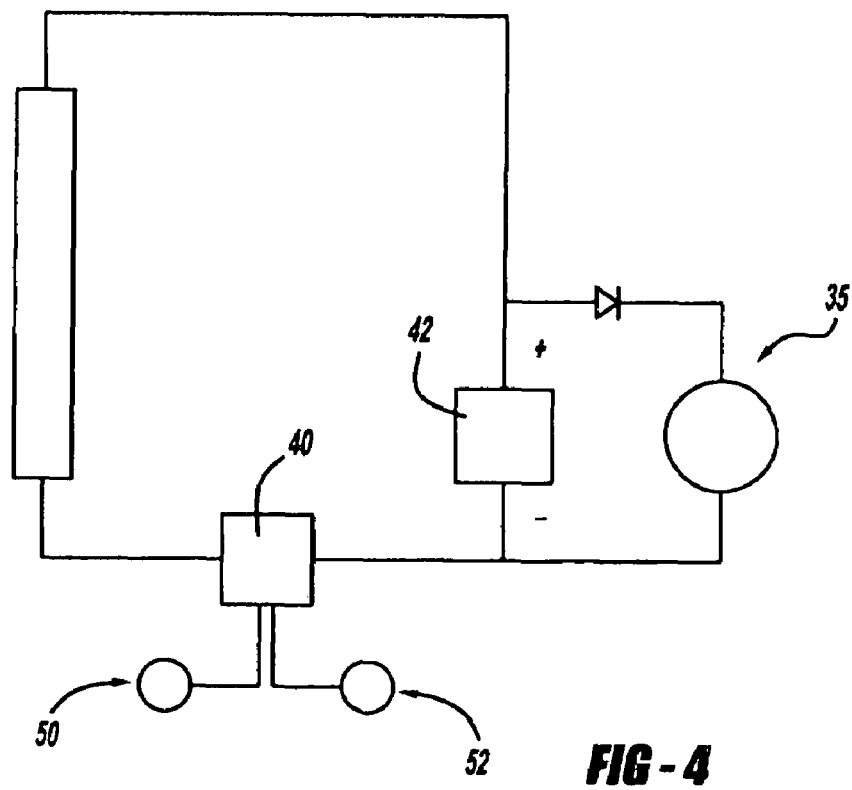
FIG. 4 is a schematic view of a preferred embodiment of a vehicle mirror assembly in accordance with the present invention.

An embodiment of a second preferable form of the invention, diagrammatically illustrated in FIG. 4, is similar to the embodiment of the first preferable form of the invention described above but ambient light, rather than glare light, is used as a power source. With this embodiment, a power storage means such as a rechargeable battery 42 is used to store power generated by a photo-voltaic cell (in the form of a solar cell 35) from ambient light (such as sun light). This stored power is used to power the dimming element 20 when glare light is incident on the mirror.

This embodiment also shows an alternative to the use of directional filters to control the level of reflective light. In this embodiment, a controller 40 is employed. The controller 40 receives signals from a forward facing photo-electric cell 50 and a rearward facing photoelectric cell 52. The forward facing cell 50 detects ambient light and the rearward facing cell 52 detects glare light.

With each of the above described embodiments the reflective element 35 is selected so as to allow some transmission of light through a photo-voltaic element and/or a photo-switch or resisting element, for instance a reflective element 21 having 60% reflectance and up to 40% transmission is used.

The signal to the dimming element 20 is voltage, current, or pulse width modulated signal controlled by the light levels. For example, conductor 27' in FIG. 1 is replaced by controller 40 for appropriate signal processing.

A slow change in the level of dimming is desirable to prevent a problem with extraneous light sources (e.g. street lights etc). This is achieved by the use of smoothing electronics where the response time of the dimming element 20 is too high.

Figure 5:
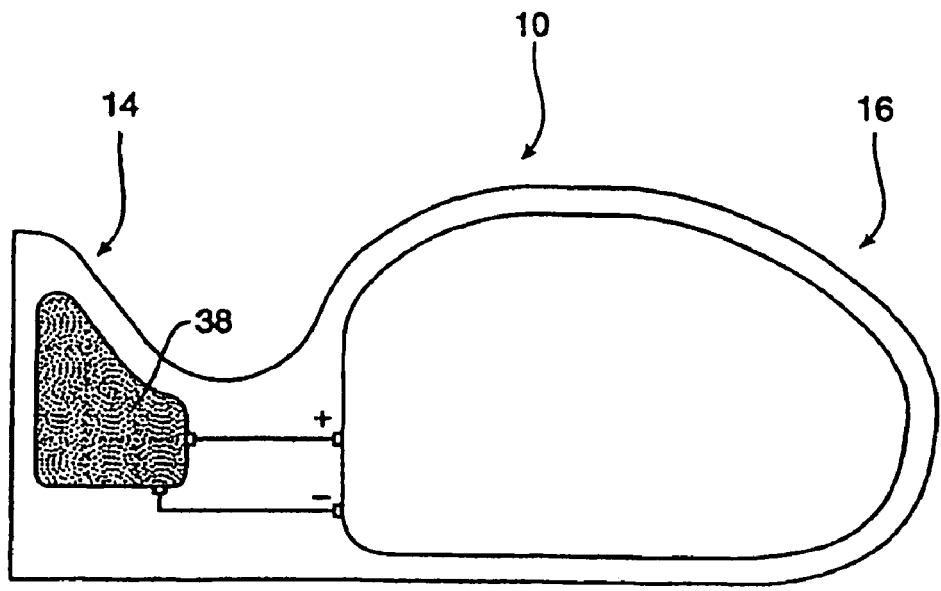
FIG. 5 is a front plan view of the vehicle mirror assembly where the light receiving aperture or lens is not behind the reflective element.
Figure 6:
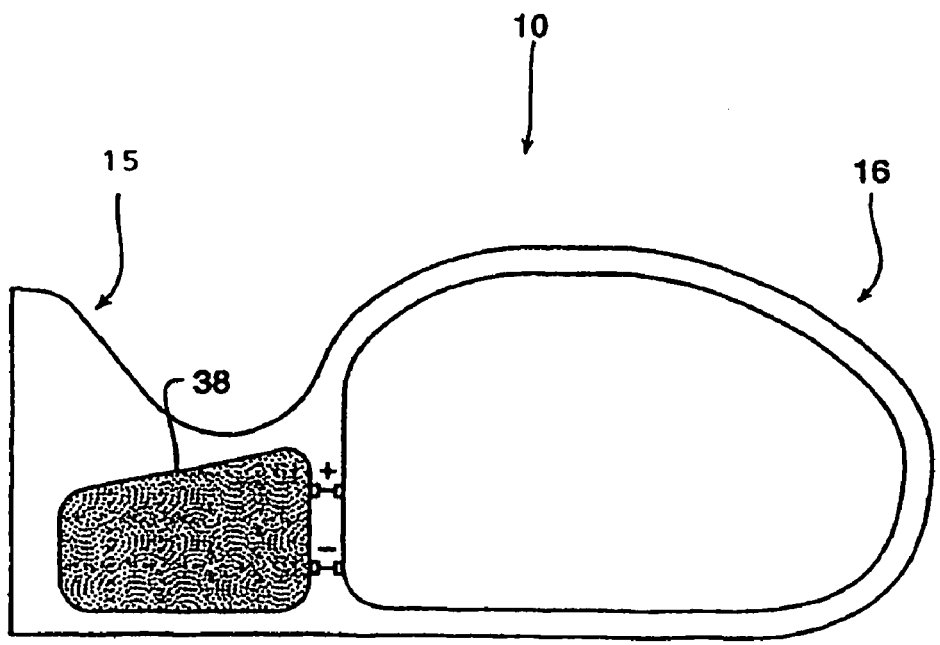
FIG. 6 is a front plan view of an alternate embodiment of the vehicle mirror assembly where the light receiving aperture or lens is not behind the reflective element.

With the embodiments illustrated in FIGS. 1 to 3 described above, the light powering the dimming element 20 must first pass through the reflective element 21. As stated above in one embodiment, the reflecting element 21 only transmits 40% or less of the incident light (with the remainder being reflected or absorbed). FIGS. 5, 6, and 7 show alternative configurations in which the light receiving aperture or lens for at least the photo-voltaic element 35 (and desirably the photo switch 36) is not located behind the reflective element 21. With these configurations, a light receiving module 38 is positioned adjacent the mirror in either the base 14 (as shown in FIG. 5), the leg 15 (as shown in FIG. 6), or around the periphery of the mirror in a housing 16 (as shown in FIG. 7). These configurations allow capture of more light energy per unit area.

FIGS. 8 to 10 show schematically three alternative arrangements for the light receiving apertures or lenses for the photo-voltaic cell 35 and the photo switch 36.

FIG. 8 shows two concentrator lenses 24 and 25 (a convex lens or a fresnel lens) for concentrating light energy onto photo-voltaic element 35 and photo switch 36 respectively. Lens 25 is angled such that ambient light is received, but glare light is not received by photo switch 36.

FIGS. 9 and 10 each show two directional filters 30 and 32 for passing light energy onto photo-voltaic element 35 and photo switch 36, respectively.

All of the above described embodiments of the invention are powered by sources of light. Therefore, no power is required from the vehicle to which the dimming mirror (or mirrors) is mounted. In some applications, this can greatly simplify both the design integration of the mirror in the vehicle and assembly of the mirror to the vehicle.

With the above-described embodiments glass sheets are used. In some applications it is preferable to use plastic. The term "glass" shall be taken to include transparent plastic.

International Application No. PCT/AU02/00352 titled "Vehicle external mirror wiring integration" discloses a pivot assembly having contacts mounted on detent surfaces for transmission of power from the base to the head. These features and other features disclosed in PCT/AU02/00352 could be used with the present invention and the disclosure of PCT/AU02/00352 is herewith incorporated in its entirety into this specification.

International Application No. PCT/AU02/00353 titled "External vehicle mirror having self-loading pivot and improved end stop" discloses a mirror assembly having a self-loading pivot mechanism wherein initial rotation of the mirror head with respect to the mirror base causes pre-loading of a spring. These features and other features disclosed could be used with the present invention and the disclosure of PCT/AU02/00353 is herewith incorporated in its entirety into this specification.

International Application No. PCT/AU00/00413 titled "Method of producing a plastic moulded part including a film covering" discloses a method of forming a moulding component comprising an outer thin film component with an adhered moulded shell. The method of that disclosure could be used to mould hollow form components that may be used with this invention (for instance for the shell of the head and base) and the disclosure of this application is incorporated herewith in its entirety.

Australian provisional patent application PR6683 titled "Foldable vehicle external mirror having auxiliary mirror" discloses a vehicle external mirror having an auxiliary mirror mounted to a distal side of the mirror head. The auxiliary mirror provides rear vision when the mirror head is in its folded position. This feature and other features disclosed in PR6683 are/could be used with the present invention. Specifically, for this instance, an auxiliary or "spotter" mirror may be used in association with a dimmable main mirror. The auxiliary mirror may be a plain mirror or may itself be dimmable. The disclosure of PR6683 is herewith incorporated in its entirety into this specification.

Australian provisional patent application number PR6204 titled "Mirror Heater" discloses an automatic heating control system and apparatus for heating the surface of a mirror to de-ice or de-fog the mirror. The heating process is initiated upon starting the vehicle engine, and is conducted in accordance with a pre-set timing sequence and in accordance with an actual measured temperature of the mirror. These features and other features disclosed in this document could be used with the present invention and the disclosure of PR6204 is hereby incorporated in its entirety into this current specification.

It would also be possible to incorporate other components with the mirror base (mounting bracket) and or mirror head. Such components include electronic sensors such as proximity sensors to determine if the vehicle mirror is close to an obstruction, sensors that sense external temperature and humidity, and sensors incorporated with the car security system such as motion detectors. Other various electronic equipment may be incorporated into the mirror base (mounting bracket) such as lights used to light the area around the vehicle, or lights that may be controlled from within the vehicle that enable the light to be moved so as to provide directional lighting. Speakers and microphones used to communicate to people external of the vehicle may also be incorporated as well as antennas for various apparatus such as mobile phones, GPS devices and other radio communication devices. In addition, transmitters may be incorporated into the mounting bracket which are used for controlling external objects such as garage doors or providing radio transmissions which may be used, for example, to track or locate the vehicle. Other electronic devices such as automatic toll payment systems or remote transaction systems may be incorporated into the mounting bracket to enable electronic registration of various toll payments.

Cameras may also be incorporated into the mirror base (mounting bracket) which are both forward and rearward looking which are designed to continuously record digital images and to store those images either on command or as a result of an accident or incident. Motion sensors including accelerometers can be used to determine the occurrence of an accident or incident so that images before and after the event are stored.

While the present invention has been described in terms of preferred embodiments in order to facilitate a better understanding of the invention, it should be appreciated that various modifications can be made without departing from the principles of the invention. Therefore, the invention should be understood to include all such modifications within its scope.

The claims defining the invention are as follows:

1. A vehicle mirror assembly comprising:
   a reflective element for reflecting incident light, the reflective element having a viewable side;
   a dimming element for varying the intensity of incident light reflected from the viewable side;
   a photo-electrical power cell for powering the dimming element;
   a controller for controlling the dimming element;
   a first directional element for allowing incident light having an angle of incidence falling within a first preset range with respect to the reflective element to reach the photo-electrical power cell, and for preventing incident light having an angle of incidence falling outside the first preset range from reaching the photo-electrical power cell;
   a photo-electrical switching device; and
   a second directional element for allowing ambient light having an angle of incidence falling within a second preset range with respect to the reflective element to reach the photo-electrical switching device,
   wherein power is supplied from the photo-electrical power cell to the dimming element as a result of incident light reaching the photo-electrical power cell, and
   wherein the power supplied from the photo-electrical power cell to the dimming element is reduced as a result of ambient light reaching the photo-electrical switching device.

2. A vehicle mirror assembly as claimed in claim 1 wherein the photo-electrical power cell is adapted to utilize the incident light from a vehicle's headlight to produce sufficient real-time power for the dimming element.

3. A vehicle mirror assembly as claimed in claim 2 wherein the dimming element comprises an electrically dimmable light transmitting sheet or panel, the sheet or panel overlaying the viewable side of the reflective element.

4. A vehicle mirror assembly as claimed in claim 3 wherein the electrically dimmable light transmitting sheet or panel comprises a gel or liquid containing suspended particles or crystals.

5. A vehicle mirror assembly as claimed in claim 2 wherein the dimming element includes the reflective element, the reflectiveness of the reflective element being electrically variable.

6. A vehicle mirror assembly as claimed in claim 1 wherein the first directional element comprises a directional filter.

7. A vehicle mirror assembly as claimed in claim 1 wherein the first directional element comprises a Fresnel lens.

8. A vehicle mirror assembly as claimed in claim 1 wherein the second directional element comprises an ambient light directional filter.

9. A vehicle mirror assembly as claimed in claim 1 wherein the first preset range is 76 degrees ±20 degrees.

10. A vehicle mirror assembly as claimed in claim 1 wherein the first preset range is 60 degrees ±20 degrees.

11. A vehicle mirror assembly comprising:
    a reflective element for reflecting incident light, the reflective element having a viewable side;
    a dimming element for varying the intensity of light reflected from the viewable side of the reflective element, wherein the dimming element overlays the viewable side of the reflective element;
    a transparent photo-electrical power cell overlaying the dimming element for powering the dimming element;
    a controller for controlling the dimming element;
    a first photo-electrical switching device;
    a first directional element for allowing ambient light having an angle of incidence falling within a first preset range with respect to the reflective element to reach the first photo-electrical switching device, and for preventing ambient light having an angle of incidence falling outside the first preset range with respect to the reflective element to reach the first photo-electrical switching device;
    a second photo-electrical switching device;
    a second directional element for allowing incident light having an angle of incidence falling within a second preset range with respect to the reflective element to reach the second photo-electrical switching device;
    wherein power is supplied from the transparent photo-electrical power cell to the dimming element as a result of the incident light reaching the second photo electrical switching device; and
    wherein the power supplied from the transparent photo-electrical power cell to the dimming element is reduced as a result of ambient light reaching the first photo-electrical switching device.

12. A vehicle mirror assembly as claimed in claim 11 wherein the photo-electrical power cell is adapted to utilize the incident light from a vehicle's headlight to produce sufficient real-time power for the dimming element.

13. A vehicle mirror assembly as claimed in claim 12 wherein the dimming element has an electrically dimmable light transmitting sheet or panel, the sheet or panel overlaying the viewable side of the reflective element.

14. A vehicle mirror assembly as claimed in claim 13 wherein the electrically dimmable light transmitting sheet or panel has a gel or liquid containing suspended particles or crystals.

15. A vehicle mirror assembly as claimed in claim 12 wherein the dimming element has the reflective element, the reflectiveness of the reflective element being electrically variable.

\* \* \* \* \*